United States Patent [19]

Meyer et al.

[11] Patent Number: 4,933,146

[45] Date of Patent: Jun. 12, 1990

[54] TEMPERATURE CONTROL APPARATUS FOR AUTOMATED CLINICAL ANALYZER

[75] Inventors: Richard C. Meyer, La Habra; Malbone W. Greene, Vista, both of Calif.

[73] Assignee: Beckman Instruments, Inc., Fullerton, Calif.

[21] Appl. No.: 884,462

[22] Filed: Jul. 11, 1986

[51] Int. Cl.[5] .............................................. G01N 35/00

[52] U.S. Cl. ........................................ 422/63; 422/64; 422/104

[58] Field of Search ......................... 73/863.11, 864.91; 356/246; 422/62-65, 67, 102; 436/43, 45, 47

[56] References Cited

U.S. PATENT DOCUMENTS

| | | | |
|---|---|---|---|
| Re. 30,391 | 9/1980 | Liston | 73/864.91 X |
| 3,616,264 | 10/1971 | Ray | 195/127 |
| 3,684,452 | 8/1972 | Bessman | 23/253 |
| 3,790,346 | 2/1974 | Ritchie | 23/253 |
| 3,856,470 | 12/1974 | Cullis et al. | 23/253 |
| 4,086,061 | 4/1978 | Hoffa et al. | 23/259 |
| 4,335,620 | 6/1982 | Adams | 422/64 X |
| 4,497,774 | 2/1985 | Scordato | 422/67 |
| 4,518,700 | 5/1985 | Stephens | 436/52 |
| 4,539,295 | 9/1985 | Blough, Jr. | 436/34 |
| 4,549,809 | 10/1985 | Minekane et al. | 422/64 X |
| 4,735,776 | 4/1988 | Yamamoto et al. | 422/65 |

FOREIGN PATENT DOCUMENTS 1503810 12/1967 France ............................. 73/863.11

OTHER PUBLICATIONS

Article, "Heat Pipes—A Cool Way to Cool Circuitry", Electronics, Feb. 16, 1970, pp. 94–100).

Article, "Heat Pipes Cool Gear in Restricted Spaces" ( Electronics, Dec. 12, 1974, pp. 114–117; A. J. Streb).

Article, "Heat Pipes Function Isothermally and Adaptably" (Space/Aeronautics, Aug. 1969, pp. 58+, Arcella et al.).

Article, "Designer's Guide to Heat Pipes" (Basiulis et al., Design News, 3-18-74, p. 159 and on).

*Primary Examiner*—Michael S. Marcus

*Attorney, Agent, or Firm*—William H. May; Arnold Grant; Gary T. Hampson

[57] ABSTRACT

A temperature control apparatus for controlling the temperature of a plurality of cuvettes consisting of an annular sealed chamber containing a refrigerant, means fixed to the sealed chamber for receiving the sample cuvettes, a heater in thermal contact with the sealed chamber, and a temperature sensor in thermal contact with the sealed chamber. The sealed chamber may include a plurality of thermally conductive posts fixed to the chamber, the spacing between adjacent ones of the posts being adapted to receive the sample cuvettes.

12 Claims, 3 Drawing Sheets

TEMPERATURE CONTROL APPARATUS FOR AUTOMATED CLINICAL ANALYZER

FIELD OF THE INVENTION

The present invention relates generally to the field of automated clinical chemistry analyzers and in particular to temperature control devices and systems for use with such analyzers.

BACKGROUND

Automated clinical chemistry analyzers are routinely used to assay the concentrations of analytes in patient samples such as blood, urine, and spinal column fluid. Typically, the patient samples are mixed with reagents and the resulting reactions are monitored using one of several well-known techniques, including colorimetry, ion selective electrodes or nephelometry, and rate methods using such analytical techniques.

It is well known in the field of clinical chemistry that a reaction may be influenced by the temperature at which the reaction is performed. If the temperature of the reaction varies, the rate of the reaction or the quantity of reaction product may also vary. The results could thus be inconsistent with previous assays or with the results of calibration reactions used to establish a calibration relationship for the assay.

The components that comprise a typical clinical chemistry reaction include one or more reagents and a patient sample. Often the reagents are refrigerated at approximately 2° to 15° C. while the samples are generally at room or ambient temperature of about 17° to 27° C. It is common, however, to perform clinical chemistry reactions at either 30° C. or 37° C. Thus, it is necessary to raise the temperature of both reagents and sample to the predetermined reaction temperature and then hold the temperature constant throughout the reaction. Because instrument throughput depends upon the number of samples that may be processed within a given time period, it is most advantageous to adjust the reagent and patient sample temperatures as quickly as possible to the reaction temperature.

There are various techniques and devices used for adjusting the temperature of reagents and samples and thereafter controlling the reaction temperature on clinical chemistry instruments. For example, it is known to use individual reaction heating coils around individual reaction vessels or cuvettes. With such individual reaction vessels, it is also known to preheat the reagent delivered into the reaction vessels so that the time required for the reagent to reach the predetermined reaction temperature is decreased. See, for example, U.S. Pat. No. 4,086,061, entitled "Temperature Control Systems for Chemical Reaction Cell" filed in the name of Hoffa et al.

Although such an approach is feasible for a relatively few number of individual reaction vessels, such an approach becomes cumbersome when the contents of a large number of reaction vessels or cuvettes are to be simultaneously assayed. To overcome this disadvantage, it is known to use circulating heated air or water baths which flow about the reaction vessels. Using such a technique, the temperature of a large number of reaction vessels or cuvettes can be simultaneously controlled.

While a circulating air or water bath can control the temperature of a large number of reaction vessels simultaneously, the rate at which heat transfers from such a bath to a reaction vessel and its contents is substantially proportional to the difference between the temperature of the vessel and the temperature of the bath, to the heat capacity of the fluid, and to the efficiency of the contact therebetween.

For example, the time required for a "perfect" heat source to change the temperature of a reaction cuvette from 27° C. to 36° C. is the same as the time required to change the reaction cuvette from 36° C. to 36.9° C. and to change from 36.9° C. to 36.99° C. With other than "perfect" heat sources, that is, essentially all practical systems, the time required for temperature changes is even longer because the heat source temperature varies with the thermal loading presented by the contents of the reaction cuvette.

In addition to the fundamental thermodynamic difficulties just discussed in using circulating fluid baths, air and water, the two common fluids used, both present further drawbacks and disadvantages. More particularly, the specific heat of air is so small that it becomes very difficult to control the temperature of reaction cuvettes to within a small part of a tenth of a degree Celsius. Thus, air is essentially useless as a thermal control fluid in clinical analyzers.

While water has a superior specific heat as compared to air, water tends to readily support the growth of algae, requiring the use of growth inhibiting agents and regular and generally burdensome routine maintenance. Furthermore, water must be rapidly moved about the reaction cuvettes to provide a suitably efficient contact between the water and the cuvettes if narrow temperature tolerances are to be maintained.

In addition to fluid baths, it is also commonly known to install reaction cuvettes in thermal contact with a temperature controlled body or mass having good thermal conductivity and a specific heat as high as practical. For example, a plurality of reaction cuvettes may be located in cavities within an aluminum or copper body. The temperature of such a body is controlled to within less than few hundredths of a degree Celsius under steady state conditions, that is, when no fluids or cuvettes are being added to or withdrawn from the body. However, when fluids other than the temperature of the body are added to cuvettes already installed on the body, or when fluid filled cuvettes are installed, a localized temperature change results. The heater controller which controls a heating element used to maintain the body at the predetermined temperature responds by altering the power input to the heating elements to restore the average temperature of the body. Unfortunately, such a system may result in temperature overshoot in other regions of the body because the temperature controller senses and controls only the average body temperature.

Thus, the various temperature control techniques known in the art each have inherent drawbacks and disadvantages relating to the time required for the contents of a reaction cuvette to come to the desired analysis temperature. Unfortunately, the time required for the temperature difference to be narrowed to the required reaction temperature directly impacts and influences the automated analyzer throughput. Where rapid sample analysis and high throughput are desired, the time required for the reaction cuvettes to be brought to the reaction temperature can be a large percentage of the time allowed for the various chemical analyses to be performed.

Thus, there is a need for an improved apparatus for adjusting and controlling the temperature of reaction cuvettes within automated clinical analyzers.

SUMMARY OF THE INVENTION

The present invention overcomes the limitations and drawbacks described above and provides an apparatus which rapidly brings a reaction vessel or cuvette and its contents to a predetermined reaction temperature. The apparatus is suitable for controlling the temperature of a plurality of reaction cuvettes and can be readily adapted for use in an automated clinical analyzer.

In accordance with the present invention, an apparatus for providing a controlled temperature environment for a plurality of cuvettes includes a sealed chamber containing a refrigerant and means fixed to the sealed chamber for receiving sample cuvettes. A heater in thermal contact with the sealed chamber heats the refrigerant therein to a predetermined reaction temperature. The apparatus also includes sensing means in thermal contact with the sealed chamber for sensing the temperature of the apparatus and controlling the heater to maintain the apparatus at the predetermined reaction temperature.

In one embodiment disclosed herein, the apparatus is generally annular in shape and includes a plurality of thermally conductive posts fixed to the reaction chamber and extending upwardly therefrom. The spacing between adjacent ones or pairs of the posts is adapted to receive the sample cuvettes. The annular sealed chamber may form the periphery of a reaction wheel, the reaction wheel being supported by means of a hub which is adapted to receive a shaft for supporting and rotating the apparatus.

DETAILED DESCRIPTION OF THE INVENTION

Figure 1:
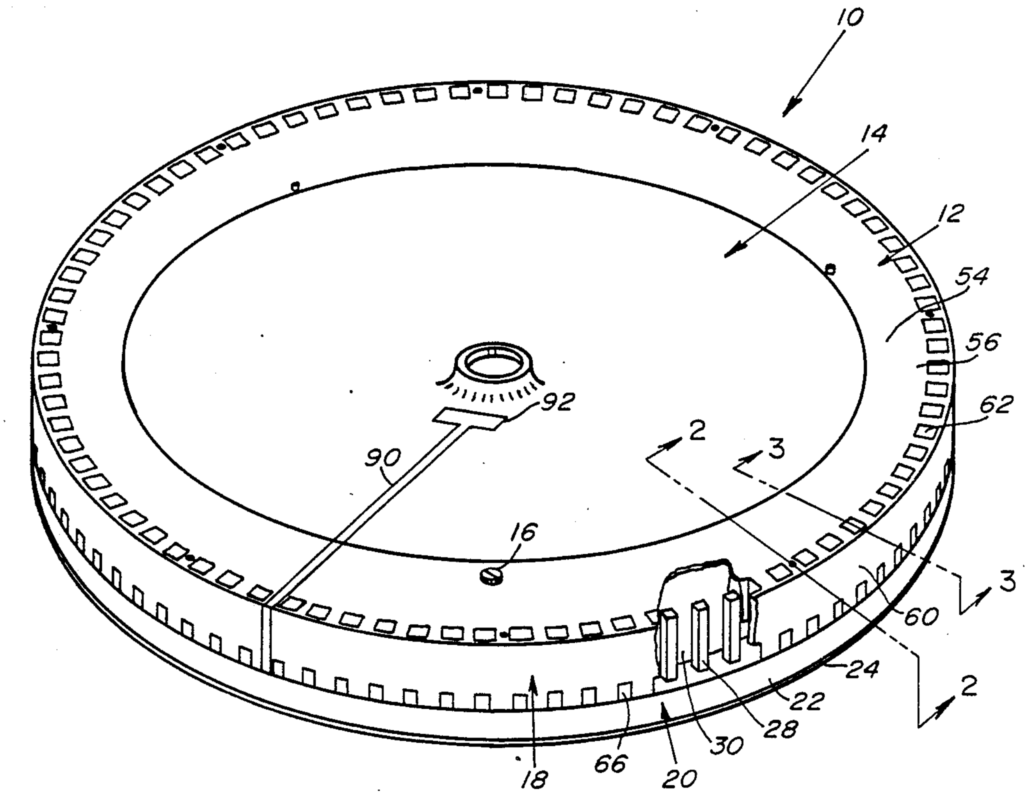
FIG. 1 is an isometric view of an apparatus in accordance with the present invention.

With reference to FIG. 1, a temperature control apparatus 10 in accordance with the present invention includes a ring assembly 12 fixed to a hub assembly 14 by means of three cap screws 16.

The ring assembly 12 (FIGS. 1–3) includes an upper portion 18 and a lower annular chamber 20. The annular chamber 20 includes a generally U-shaped annular ring 22 and an annular cover 24. The open portion of the U-shaped annular ring 22 is directed downwardly as seen in the Figures. The annular cover 24 is fixed to the ring 22 by, for example, laser welding, to form an enclosed void 26. A plurality of upwardly extending thermally conductive posts 28 are fixed to the annular chamber 20.

The annular ring 22, cover 24 and posts are preferably formed of a heat conductive material such as aluminum alloy or copper. The annular ring 22 and posts 28 may be integrally formed, for example, by machining or die-cast injection molding, or the posts 28 may be separately formed and bonded to the ring 22 by soldering, brazing or with a suitable heat-conductive epoxy compound. If formed separately, the posts 28 may be formed from aluminum and the annular chamber 20 formed from copper. The posts 28 define eighty spaces 30 therebetween adapted to receive glass or clear plastic cuvettes 32 having essentially a square cross section. The cuvettes fit snuggly within the spaces 30, providing good physical contact between the cuvettes 30, posts 28 and the annular ring 22.

Figure 3:
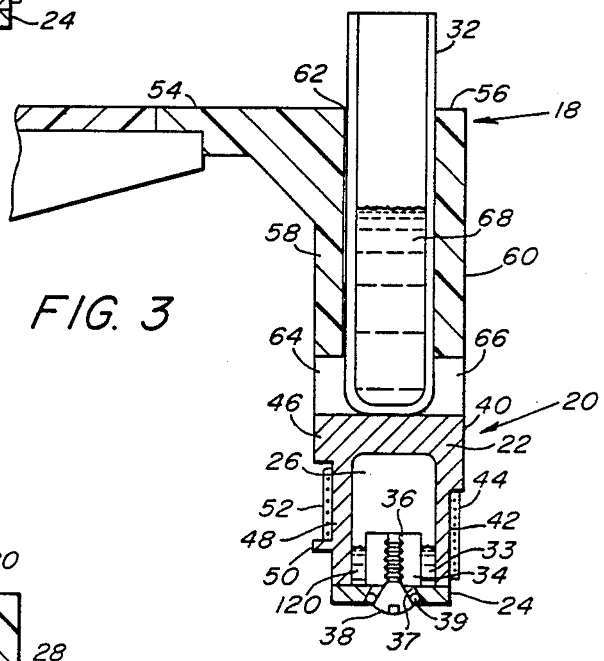
FIG. 3 is a section view of the apparatus of FIG. 1 taken along plane 3—3 of thereof.

As seen in FIG. 3, the cover 24 includes a plurality of ports 33 for cleaning, drying and evacuating the void 26 and for introducing refrigerant into the void 26 as is described hereinbelow. Each port 33 includes a boss 34 fixed to the cover 24 and positioned within the void 26. A threaded hole 36 is formed through the cover 24 and the boss 34, the lower exterior surface of the hole 36 being formed to define a tapered sealing surface 37. The threaded hole 36 is adapted to receive a screw 38. An O-ring 39 forms a seal between the head of the screw 38 and the tapered sealing surface 37. In the embodiment disclosed herein, four such ports 33 are included in the apparatus 10.

An outer wall 40 of the annular ring 22 includes a reduced lower section 42 defining a ring-shaped circular surface which receives a heating element 44. In the embodiment disclosed herein, the heating element is an insulated thermofoil material having a total resistance of about 22 ohms and is adapted to dissipate approximately 10 watts of power when 24 volts d.c. is applied thereto.

An inner wall 46 of the annular ring 22 includes a reduced middle portion 48 and a projection 50 which together cooperate to define a ring-shaped circular surface or area which receives a temperature sensor 52. In the embodiment disclosed herein, the temperature sensor 52 comprises an electrically insulated nickel-iron wire or foil bonded to the reduced portion 48. The temperature sensor 52 may have a nominal resistance of approximately 700 ohms at 37° C. and may have a positive temperature coefficient of approximately 0.0045 ohms per ohm° C.

Figure 2:
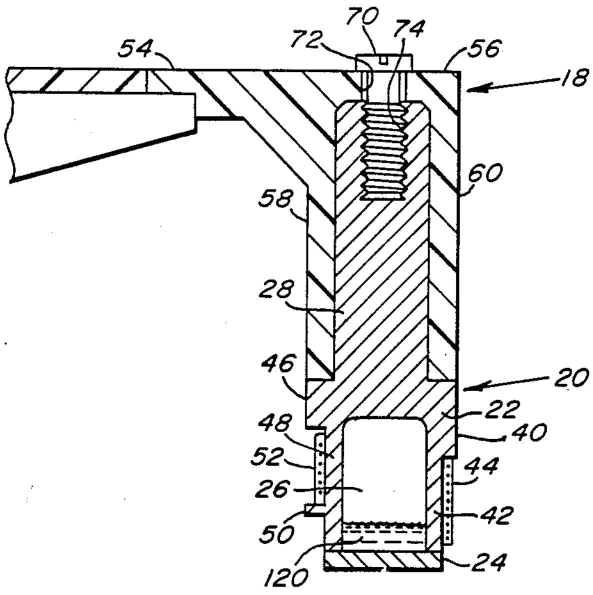
FIG. 2 is a section view of the apparatus of FIG. 1 taken along plane 2—2 thereof.

With continued reference to FIGS. 1–3, the upper portion 18 includes a generally horizontal annular member 54 which is adapted to be fixed to the hub assembly 14 as described above. The annular member 54 is integrally formed with an annular top portion 56, an inside vertical member or wall 58, and an outside vertical member or wall 60. The annular top portion 56 includes a plurality of square openings 62 formed therethrough adapted to receive the cuvettes 32. The openings 62 are aligned with the spaces 30 between the pegs 28. The inside and outside walls 58 and 60 include radially aligned square openings 64 and 66, respectively, the openings 64 and 66 being aligned with the spaces 30 between the posts 28. The openings 64 and 66 provide a path through the apparatus 10 and the cuvettes 32 for the optical measurement of a reaction occurring within fluid 68 disposed within a cuvette 32. As is well known in the art, the fluid 68 may comprise a mixture of suitable reagents and a patient sample or control or calibration substance.

In the embodiment disclosed herein, the upper portion 18 is formed of a plastic material by, for example, an injection molding process. The upper portion 18 is fixed to the annular chamber 20 by means of screws 70 which pass through openings 72 in the top portion 56 into threaded holes 74 at the tops of eight posts 28 spaced about the apparatus 10.

Figure 4:
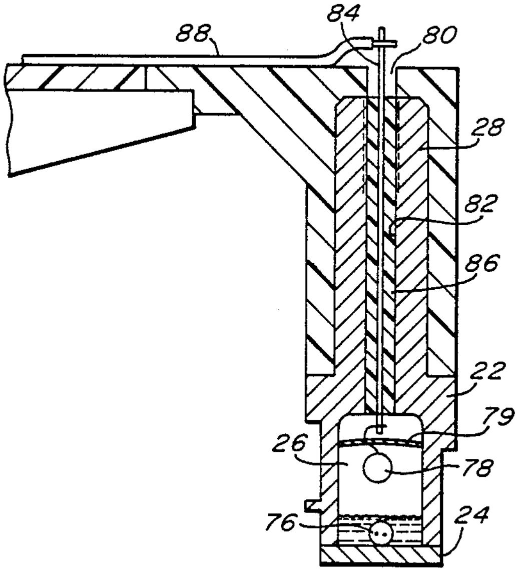
FIG. 4 is a section view of another embodiment of the present invention illustrating alternative placements for a heater and a temperature sensor.

With reference to FIG. 4, an alternative placement for a heater and temperature sensor is illustrated therein. A heater 76 comprising insulated resistive heating wire elements may be disposed inside the void 26 and affixed to the upper inside surface of the cover 24. Likewise, a temperature sensor 78 such as a thermistor may be disposed within the void 26 near the top thereof. A shield 79 is fixed within the void 26 above the temperature sensor 78 to protect the temperature sensor 78 from droplets of refrigerant condensed within the chamber 20. Wires from the temperature sensor 78 are routed around the shield 79.

Electrical connections for both the heater 76 and the temperature sensor 78 are provided by means of feed-throughs illustrated typically at 80. The feed-throughs 80 are placed in selected ones of the posts 28 as required for the electrical connections to the heater 76 and the temperature sensor 78. Each of the feed-throughs 80 is formed by an opening 82 passing through a post 28. Coaxially aligned with the opening 82 is a conductor 84 secured within the opening 82 by means of a sealing compound 86. A wire 88 connects the feed-through 80 to temperature control circuitry (described hereinbelow) through suitable slip-ring connectors between the temperature control apparatus 10 and stationary structure (not shown) associated therewith.

Returning to the embodiment of FIGS. 1–3, a flat flexible conductor strip 90 connects the heating element 44 and temperature sensor 52 to a circuit board 92 proximate the center of the temperature control apparatus 10. The circuit board 92 is used to connect the conductor strip 90 through suitable slip-ring connectors (not shown) to a temperature control circuit 98 (FIG. 5).

Figure 5:
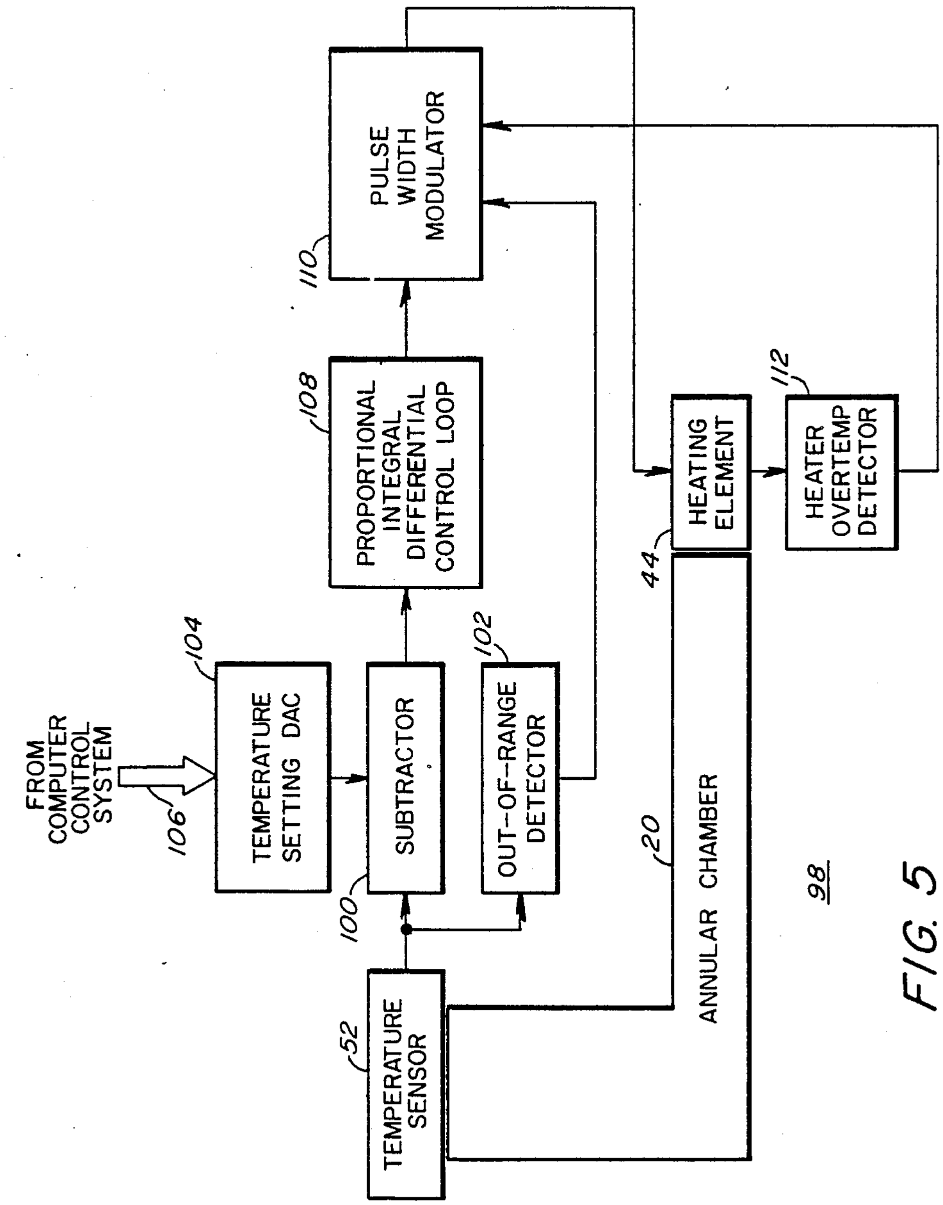
FIG. 5 is a block diagram of a temperature control system for use with the apparatus of FIG. 1.

With reference to FIG. 5, the temperature sensor 52 develops a signal that is proportional to the temperature of the annular chamber 20 and such signal is applied to a subtractor 100 and an out-of-range detector 102. A temperature setting digital-to-analog converter (DAC) 104 receives a digital word via lines 106 and converts the digital word to an analog voltage that is applied to the subtractor 100. The subtractor 100 subtracts the two signals applied thereto, generating an error voltage that is applied to a proportional integral differential control loop 108. The control loop 108 generates a signal that is proportional to the error voltage applied thereto and the rate of change of such error voltage.

The resulting signal from the control loop 108 is applied to a pulse width modulator 110 which generates a pulse width modulated output proportional to the signal applied thereto. The output of the pulse width modulator 110 is in turn applied to the heating element 44. The resistance of the heating element 44 is monitored by heater over-temperature detector 112 to determine whether the heating element 44 is in an over-temperature condition. If so, the heater-over-temperature detector 112 generates an output that is applied to the pulse width modulator 110, disabling the pulse width modulator 110 until the heating element 44 returns to its specified operating range.

To prepare the apparatus 10 for use, the screws 36 are removed from the ports 33. The void 26 within the chamber 20 is cleaned, as for example, by filling with and then removing a suitable cleaning solution. The void 26 is dried by, for example, heating the chamber 20 and evacuating the void 26. The void 26 is again evacuated and filled to approximately 10% to 40% of its volume with a suitable refrigerant 120 such as Freon type 12. The screws 36 with O-rings 39 are replaced to thus seal the refrigerant 120 within the chamber 20. Freon refrigerant F-11 is also suitable for use with the apparatus 10, particularly where a lower internal operating pressure is required.

The apparatus 10 is mounted to a rotatable shaft as is described above and connected to the temperature controller circuit 98.

A digital word corresponding to the desired temperature of the apparatus 10 is applied to the temperature setting DAC 104. In the embodiment disclosed herein, for example, a digital word may be generated by a microcomputer control system for the clinical analyzer which contains the apparatus 10. Such systems are well known in the art and need not be further described here. The digital word may correspond to either 30° C. or 37° C. The temperature controller operates the heating element 44 so as to heat the annular chamber 20 and the refrigerant 120 included therein toward the predetermined reaction temperature as sensed by the temperature sensor 52. As the temperature of the annular chamber 20 and the refrigerant 120 increases, a portion of the refrigerant 120 vaporizes and is contained within the chamber 20. Once the annular chamber 20 and the refrigerant 120 reach the predetermined reaction temperature, the liquid and vapor phases of the refrigerant 120 reach an equilibrium condition wherein the pressure of the vaporized refrigerant 120 within the annular chamber 20 remains essentially constant.

When a cuvette 32 having a temperature lower than the predetermined reaction temperature is placed onto the apparatus 10, or when an empty cuvette 32 that is already installed on the apparatus 10 is filled with a fluid 68 that is below the temperature of the apparatus 10, heat from the annular chamber 20 flows to the cuvette 32 through the thermally conductive top of the annular chamber 20 and through the thermally conductive posts 28 on either side of the cuvette 32. In response to the heat flow, localized cooling of the chamber 20 in the immediate area of the cuvette 32 causes vaporized refrigerant within the chamber 20 to rapidly condense, liberating additional heat that flows through the annular chamber 20 and posts 28 to the cuvette 32. The condensed refrigerant falls back into the liquid refrigerant 120 in the lower portion of the annular chamber 20. The condensed refrigerant reduces the vapor pressure within the annular chamber 20, causing liquid refrigerant 120 within the annular chamber 20 to vaporize. As this process continues, the temperature controller circuit 98 with the temperature sensor 52 and the heating element 44 operate as described above to maintain the temperature of the annular chamber 20 at the predetermined reaction temperature.

The cycle of vaporized refrigerant condensation at locally cooled locations around the annular chamber 20 and then revaporization of liquid refrigerant 120 heated under control of the temperature controller circuit 98 continues as cuvettes 32 and/or fluid 68 within such cuvettes 32 are added to the temperature control apparatus 10. The localized heating produced by the cycle described provides the maximum heat to the vicinity of the localized cooling without overheating other portions of the apparatus 10. The localized heating provided to each cuvette 32 on the apparatus 10 is very rapid and precise, particularly in comparison to air and water bath techniques known in the art as described above in the Background of the present invention.

It will be appreciated by those skilled in the art that various modifications to the apparatus disclosed herein are possible and that the scope of the present invention is to be limited only by the scope of the claims appended hereto.

We claim:

1. An apparatus for providing a temperature controlled environment for a plurality of locations adapted to receive a plurality of sample cuvettes, comprising:
   an annular sealed chamber;
   refrigerant means for effecting heat transfer by vaporization and condensation and being present within the chamber in both a liquid phase and gas phase, the chamber including a thermally conductive portion that is in thermal contact with the gas phase of the refrigerant;
   a plurality of thermally conductive posts fixed to the thermally conductive portion of the chamber, the spaces between adjacent ones of the posts being adapted to receive the sample cuvettes;
   a heater in thermal contact with the sealed chamber; and
   sensing means in thermal contact with the sealed chamber.

2. An apparatus as in claim 1 wherein the apparatus further includes side members between the posts for supporting the cuvettes and the side members include a plurality of openings therein defining optical paths through the spaces between adjacent ones of the posts.

3. An apparatus for providing a temperature controlled environment for a plurality of locations adapted to receive a plurality of sample cuvettes, comprising:
   a sealed chamber;
   static refrigerant means for effecting heat transfer by vaporization and condensation and being present within the chamber in both a liquid phase and a gas phase;
   receiving means adapted for receiving the sample cuvettes and for positioning the sample cuvettes on a portion of the sealed chamber that is in thermal contact with the gas phase of the refrigerant means, the receiving means including a plurality of posts fixed with respect to the chamber the spacing between adjacent ones of the posts adapted to receive the sample cuvettes;
   a heater in thermal contact with the sealed chamber; and
   sensing means in thermal contact with the sealed chamber.

4. An apparatus as in claim 3 wherein the receiving means further includes side members adapted for supporting the sample cuvettes.

5. An apparatus as in claim 4 wherein the side members include a plurality of openings therein defining optical paths through the spaces between adjacent ones of the posts.

6. An apparatus for providing a temperature controlled environment for a plurality of cuvettes containing samples for analysis, comprising:
   a sealed chamber consisting of wall means defining an enclosed volume having static refrigerant means therein, said refrigerant means effecting heat transfer with sample containing cuvettes by vaporization and condensation of said static refrigerant means, said static refrigerant means forming both a liquid and gas phase within said enclosed volume;
   receiving means connected to said sealed chamber for receiving a plurality of sample containing cuvettes and positioned to maintain sample containing cuvettes in thermal contact with the gas phase of the static refrigerant means;
   a heater in thermal contact with the sealed chamber; and
   sensing means in thermal contact with the sealed chamber.

7. An apparatus for providing a temperature controlled environment for a plurality of cuvettes containing samples for analysis, comprising:
   a sealed annular chamber consisting of wall means defining an enclosed volume having static refrigerant means therein, said refrigerant means effecting heat transfer with sample containing cuvettes by vaporization and condensation of said static refrigerant means, said static refrigerant means forming both a liquid and gas phase within said enclosed volume;
   receiving means connected to said sealed chamber for receiving a plurality of sample containing cuvettes and positioned to maintain sample containing cuvettes in thermal contact with the gas phase of the static refrigerant means;
   a heater in thermal contact with the sealed chamber;
   sensing means in thermal contact with the sealed chamber; and
   wherein the sealed chamber includes an inner circular surface and an outer circular surface and the heater is disposed on one of such surfaces.

8. An apparatus for providing a temperature controlled environment for a plurality of cuvettes containing samples for analysis, comprising:
   a sealed annular chamber consisting of wall means defining an enclosed volume having static refrigerant means therein, said refrigerant means effecting heat transfer with sample containing cuvettes by vaporization and condensation of said static refrigerant means, said static refrigerant means forming both a liquid and gas phase within said enclosed volume;
   receiving means connected to said sealed chamber for receiving a plurality of sample containing cuvettes and positioned to maintain sample containing cuvettes in thermal contact with the gas phase of the static refrigerant means;
   a heater in thermal contact with the sealed chamber; and
   wherein the sealed chamber includes an inner circular surface and an outer circular surface and an outer circular surface and the sensing means is disposed on one of such surfaces.

9. An apparatus for providing a temperature controlled environment for a plurality of cuvettes containing samples for analysis, comprising:
   a sealed chamber consisting of wall means defining an enclosed volume having static refrigerant means therein, said refrigerant means effecting heat transfer with sample containing cuvettes by vaporization and condensation of said static refrigerant means, said static refrigerant means forming both a liquid and gas phase within said enclosed volume;
   receiving means connected to said sealed chamber for receiving a plurality of sample containing cuvettes and positioned to maintain sample containing cuvettes in thermal contact with the gas phase of the static refrigerant means;
   a heater in thermal contact with the sealed chamber;

sensing means in thermal contact with the sealed chamber; and wherein the heater is disposed inside the chamber.

10. An apparatus for providing a temperature controlled environment for a plurality of cuvettes containing samples for analysis, comprising:

a sealed chamber consisting of wall means defining an enclosed volume having static refrigerant means therein, said refrigerant means effecting heat transfer with sample containing cuvettes by vaporization and condensation of said static refrigerant means said static refrigerant means forming both a liquid and gas phase within said enclosed volume;

receiving means connected to said sealed chamber for receiving a plurality of sample containing cuvettes and positioned to maintain sample containing cuvettes in thermal contact with the gas phase of the static refrigerant means;

a heater in thermal contact with the sealed chamber;

sensing means in thermal contact with the sealed chamber; and wherein the sensing means is disposed inside the chamber.

11. An apparatus for providing a temperature controlled environment for a plurality of cuvettes containing samples for analysis, comprising:

a sealed annular chamber consisting of wall means defining an enclosed volume having static refrigerant means therein, said refrigerant means effecting heat transfer with sample containing cuvettes by vaporization and condensation of said static refrigerant means, said static refrigerant means forming both a liquid and gas phase within said enclosed volume;

receiving means connected to said sealed chamber for receiving a plurality of sample containing cuvettes and positioned to maintain sample containing cuvettes in thermal contact with the gas phase of the static refrigerant means;

a heater in thermal contact with the sealed chamber; and sensing means in thermal contact with the sealed chamber.

12. An apparatus as in claim 11 wherein the annular chamber is supported by a hub and the hub includes an opening at the center thereof adapted to receive a shaft for supporting and rotating the apparatus.

* * * * *

UNITED STATES PATENT AND TRADEMARK OFFICE

CERTIFICATE OF CORRECTION

PATENT NO. : 4,933,146

DATED : June 12, 1990

INVENTOR(S) : Meyer, et al.

It is certified that error appears in the above-identified patent and that said Letters Patent is hereby corrected as shown below:

Col. 8, lines 47 and 48 (claim 8) reads: "a heater in thermal contact with the sealed chamber; and wherein the sealed chamber..." should read --a heater in thermal contact with the sealed chamber; sensing means in thermal contact with the sealed chamber; and wherein the sealed chamber...--

Signed and Sealed this

Tenth Day of May, 1994

Attest:

BRUCE LEHMAN

*Attesting Officer*

*Commissioner of Patents and Trademarks*